United States Patent
Xu et al.

(10) Patent No.: US 7,552,129 B2
(45) Date of Patent: Jun. 23, 2009

(54) AUTOMATICALLY BINDING AND POPULATING A SELECTION CONTROL WITH BOTH DISPLAY LABELS AND IDENTIFICATION VALUES

(75) Inventors: Li Xu, Cary, NC (US); Jianjun Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 11/411,664

(22) Filed: Apr. 26, 2006

(65) Prior Publication Data
US 2007/0256052 A1 Nov. 1, 2007

(51) Int. Cl.
G06F 7/00 (2006.01)
G06F 9/44 (2006.01)
G06F 15/16 (2006.01)

(52) U.S. Cl. .................. 707/101; 717/109; 709/229
(58) Field of Classification Search ......... 707/101–102; 717/109; 709/229
See application file for complete search history.

(56) References Cited

U.S. PATENT DOCUMENTS

| | | | |
|---|---|---|---|
| 5,740,439 | A | 4/1998 | Atkinson et al. |
| 5,761,656 | A | 6/1998 | Ben-Shachar |
| 6,154,786 | A | 11/2000 | Williamson et al. |
| 6,330,006 | B1 | 12/2001 | Goodisman |
| 6,429,880 | B2 | 8/2002 | Marcos et al. |
| 6,640,244 | B1 * | 10/2003 | Bowman-Amuah ......... 709/207 |
| 7,275,063 | B2 * | 9/2007 | Horn ........................... 707/102 |
| 2003/0007009 | A1 | 1/2003 | Haley |
| 2004/0080545 | A1 | 4/2004 | Kobal et al. |
| 2004/0177319 | A1 * | 9/2004 | Horn ........................ 715/501.1 |
| 2004/0230911 | A1 | 11/2004 | Bent |
| 2005/0005260 | A1 * | 1/2005 | Antonov et al. ............. 717/107 |
| 2005/0049814 | A1 | 3/2005 | Ramchandani |
| 2006/0212800 | A1 * | 9/2006 | Kamiya ....................... 715/513 |
| 2006/0236302 | A1 * | 10/2006 | Bateman et al. ............. 717/104 |
| 2007/0002689 | A1 * | 1/2007 | Mateescu et al. .............. 367/73 |
| 2007/0100762 | A1 * | 5/2007 | Luo et al. ...................... 705/59 |
| 2008/0109785 | A1 * | 5/2008 | Bailey ......................... 717/109 |

OTHER PUBLICATIONS

Shrader et al., "Design For An Application Window Toolbox Menu", TDB v36 n5 May 1993 p. 263-264.
Kataoka, K, "Platform Independent And User Changeable Interface", TDB v38 n11 Nov. 1995 p. 231-232.

* cited by examiner

*Primary Examiner*—Christian P. Chace
*Assistant Examiner*—Tarek Chbouki
(74) *Attorney, Agent, or Firm*—Martin J. McKinley; Law Office of Jim Boice

(57) ABSTRACT

A method, system and computer-usable medium are presented for binding multi-value data structures to a selection control in one single action, where one of the multi-value data structures is for identification values and the other multi-value data structure is for labels. In one embodiment, the method includes the steps of predictively determining that a data structure is either an identifier value or a label; and simultaneously associating a predictively determined identifier value and a predictively determined label with a widget in an editor pane in an Integrated Development Environment (IDE).

1 Claim, 5 Drawing Sheets

AUTOMATICALLY BINDING AND POPULATING A SELECTION CONTROL WITH BOTH DISPLAY LABELS AND IDENTIFICATION VALUES

BACKGROUND OF THE INVENTION

The present invention relates in general to the field of computers and similar technologies, and in particular to software utilized in this field.

In an application development environment, such as an Integrated Development Environment (IDE), users often need to create selection controls (a.k.a. "widgets") such as combo-boxes, dropdown lists, etc. These kinds of controls typically have two sets of data structures bound to them: identification values and labels. For example, a dropdown list may be for a list of employees, whose records are identified and recorded by their identification value (such as "0001", "0002", "0003", etc.). Similarly, each record will have one or more label associated with each identification value, such as "Name", "Age", etc. To configure such controls, users need to identify individually where the two sets of values come from for binding to the selection control, which is a tedious task that is error-prone.

SUMMARY OF THE INVENTION

To address the problem described above, a method, system and computer-usable medium are presented for binding multi-value data structures to a selection control in one single action, where one of the multi-value data structures is for identification values and the other multi-value data structure is for labels. In one embodiment, the method includes the steps of predictively determining that a data structure is either an identifier value or a label; and simultaneously associating a predictively determined identifier value and a predictively determined label with a widget in an editor pane in an Integrated Development Environment (IDE).

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

As will be apparent in the following description, the present invention requires a system that includes a data model that describes the multiplicity of each element in the data model; a visualization system of the data model, which allows for selection and drag-and-dropping of each element, and a visualization of the control that accepts drag-and-dropping of the element for configuring binding to the control.

Figure 1A:
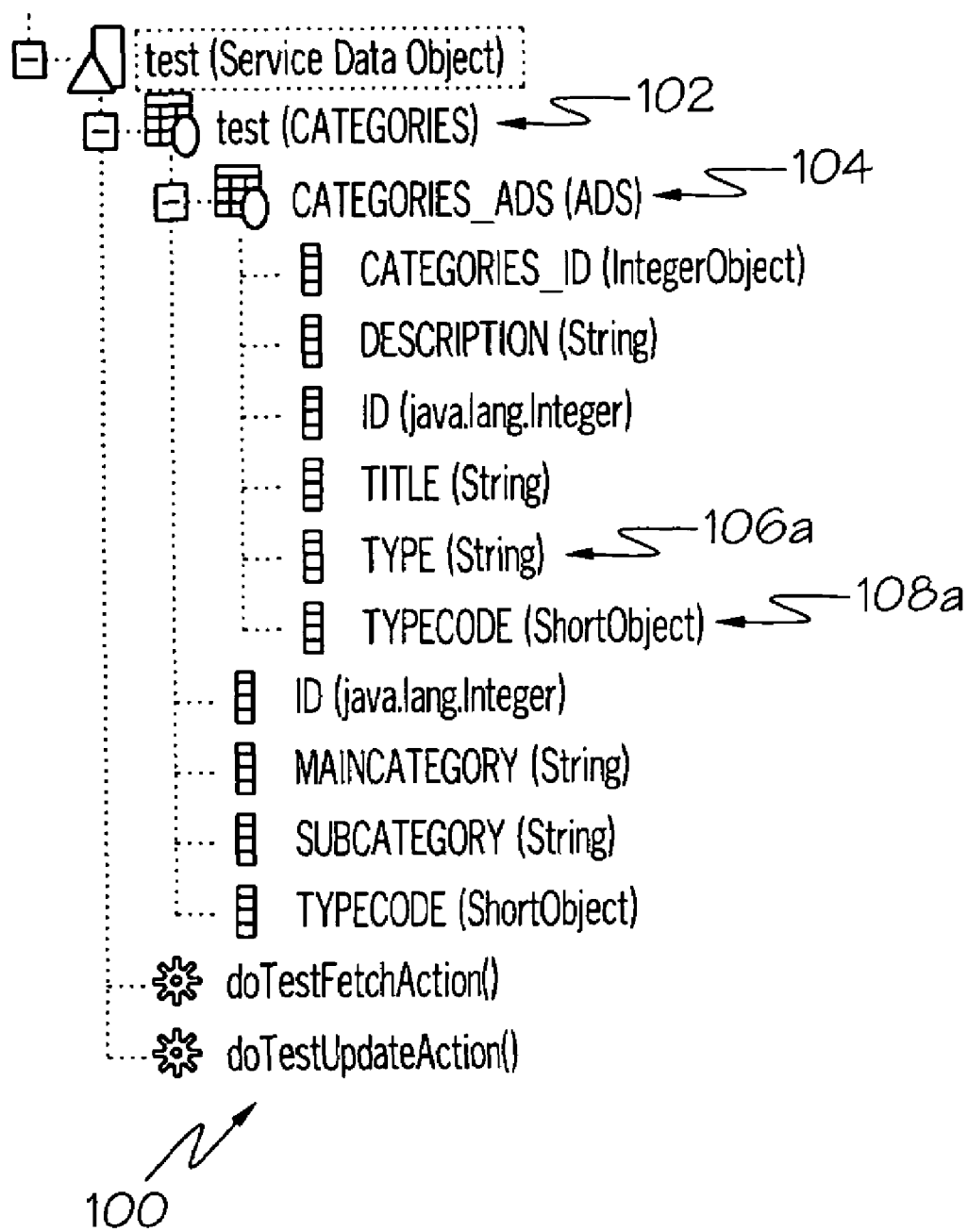
FIG. 1*a* depicts an exemplary data model showing both identifier values and labels.
Figure 1B:
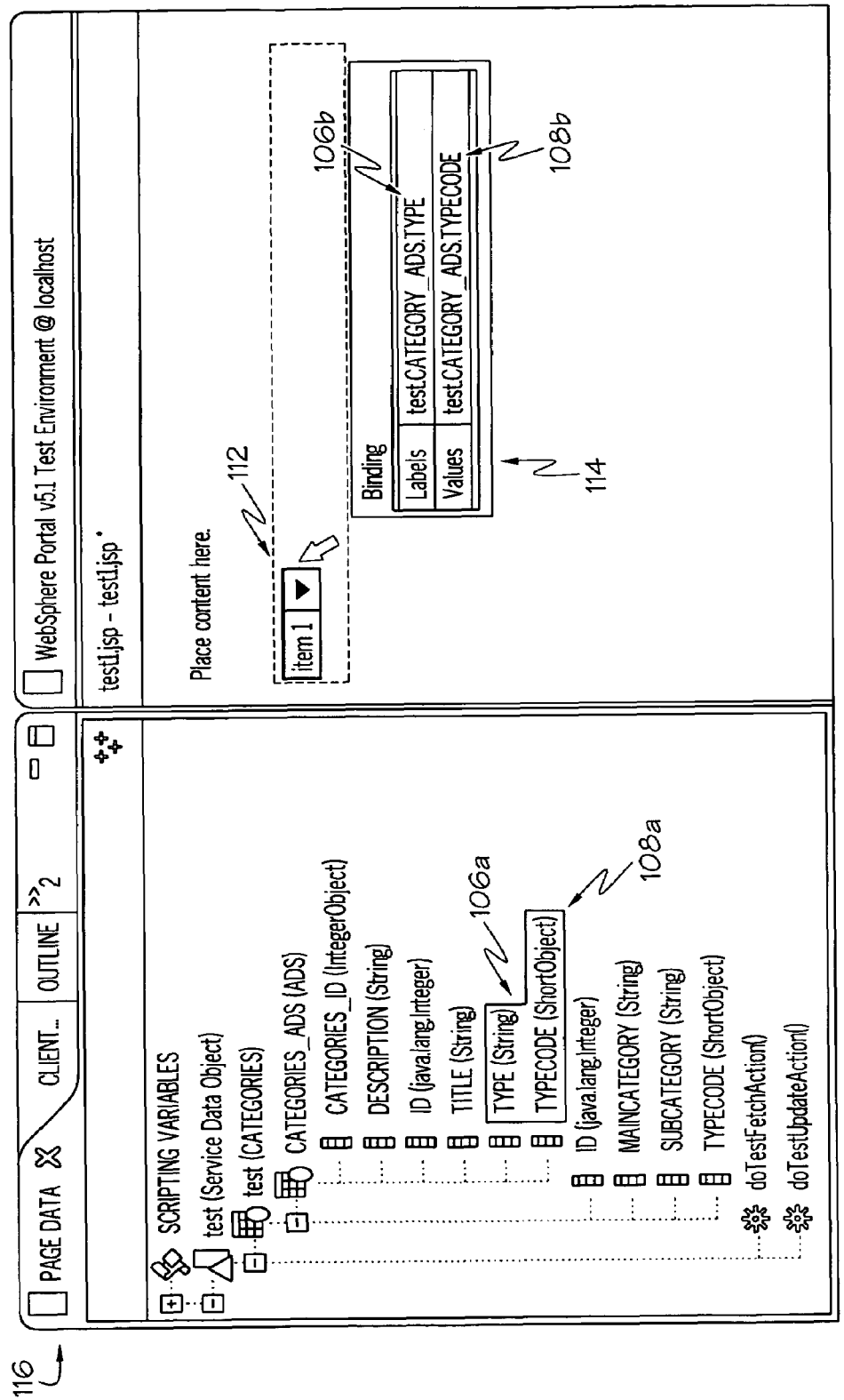
FIG. 1*b* illustrates an Integrated Development Environment (IDE) that utilizes data model drag-and-dropping according to an exemplary embodiment of the present invention.

With reference now to the figures, and in particular to FIG. 1*a*, there is depicted an exemplary data model 100. Data model 100 includes a test element 102, which in the model is multi-valued, as is "CATEGORIES_ADS" 104. A user may want to bind TYPE (String) field 106*a* to a combo-box as the label for entries, and to bind TYPECODE (ShortObject) field 108*a* to the combo-box as the identifier value for the combo-box. To do so, the user can select both fields (106*a* and 108*a*) and drag-and-drop them into a combo-box control. For example, consider the Integrated Development Environment (IDE) 110 shown in FIG. 1*b*. Fields 106 (106*a*) and 108 (108*a*) are dragged from page data pane 116 into combo-box control 114, where fields 106*a* and 108*a* are prospectively and respectively bound with target control 112 (e.g., a User Interface "widget" that for exemplary purposes is shown as a combo-box) as labels 106*b* and identifier values 108*b*. Thus, the method detects that two elements have been dropped, and both elements are multi-valued. That is, the method recognizes that the intended binding is to populate the entries of the combo-box, and that two sets of data structures have been supplied. The method then decides the order of the settings ("Label" or "Value"), and gives a user a chance to switch the order before committing the binding. If the user wants to switch the binding order, then the user holds down a function key (e.g., "Ctrl") during drag-over. That is, the user can change the setting of a data structure entry from "Label" to "Value" and vice versa. However, on drop, the binding is complete.

Figure 2A:
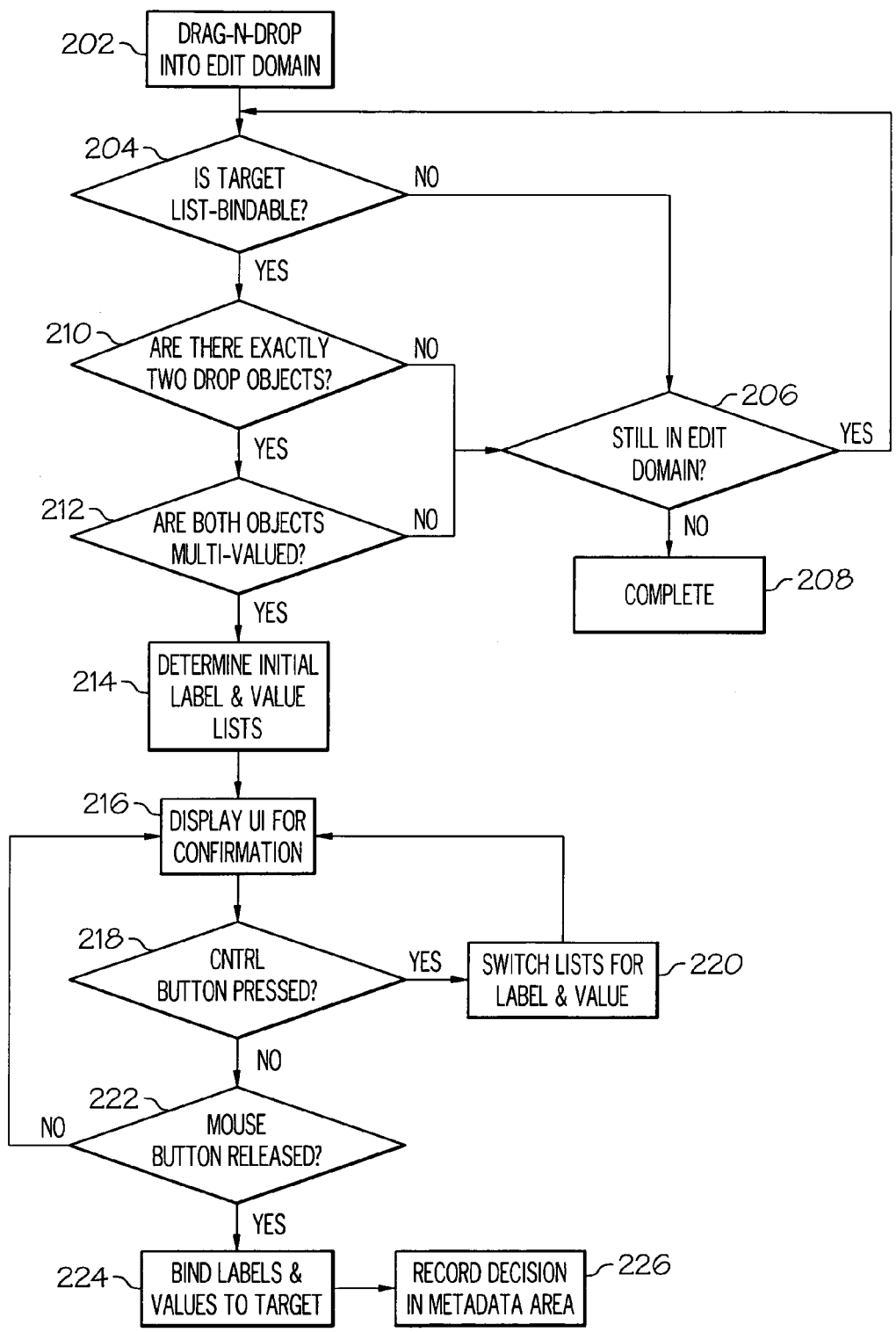
FIGS. 2*a-b* are flow-charts of exemplary steps taken by the present invention.
Figure 2B:
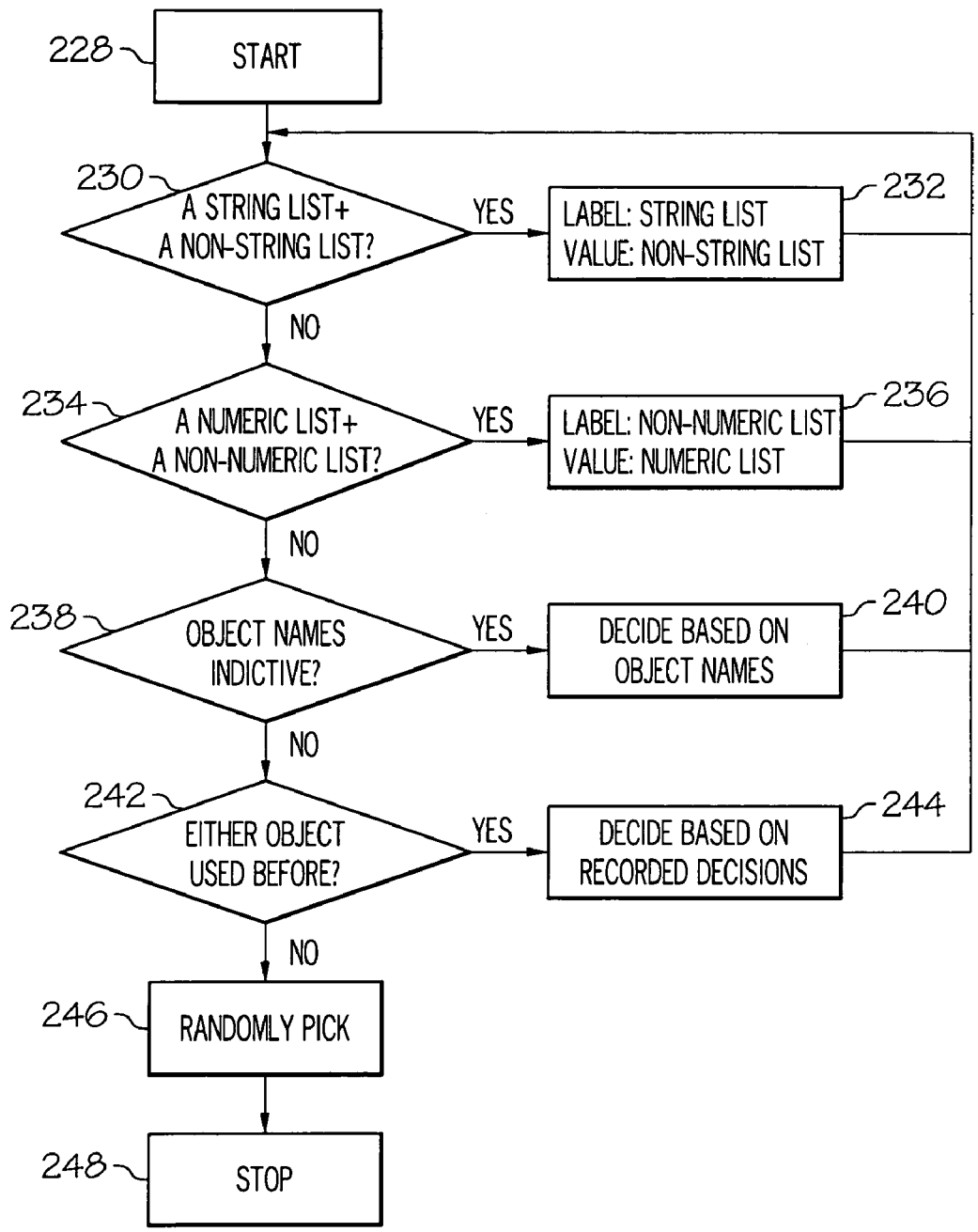

FIGS. 2*a-b* present a flow-chart of exemplary steps taken by the present invention. The main flow of the present invention's exemplary steps are shown in FIG. 2*a*. As described in block 202, data structures are first drag-and-dropped into an edit domain (editor pane) of the IDE. A query (query block 204) is made as to whether the data structures are bindable to a target (e.g., the UI widget shown as target control 112 in FIG. 1*b*). If not, a query is made as to whether the IDE is still in edit mode (query block 206). If not, then the process ends (block 208). Returning to query block 204, if the data structures are bindable to the target, then a query is made as to whether there are exactly two drop object (query block 210). If not, then the process repeats in an iterative manner as shown back up to query block 204 (if still in the edit domain). This requirement for there to be only two drop objects is due to the preferred step of assigning one of the data elements a "identifier value" role and the other data element the "label" role. In an alternative embodiment, there may be multiple label data elements, which are concatenated together after the "identifier value" data structure is identified.

Returning to query block 210, if there are exactly two drop objects, then a query is made as to whether both drop objects are multi-valued (query block 212). This requirement is necessary because if the objects are not multi-valued, then there is no need for specific identifier values to be associated with each of the multiple labels. If the conditions of query blocks 204, 210 and 212 are all met ("yes"), then identifier values and label lists are determined for association with the data structure objects (block 214).

Additional details of the step stated in block 214 are shown in FIG. 2*b*. After initiator block 228, a determination is made as to whether one of the data elements is a string list and the other is a non-string list (query block 230). If so (block 232), then the string list is determined to be the label (e.g., "Name"), and the non-string list is determined to be the identifier value (e.g., "0001"). If not, then the process continues to query block 234, in which a query is made as to whether one of the data structures is a numeric list and the other data structure is a non-numeric list. If so (block 236), then the numeric list data structure is determined to be an identifier value and the non-numeric data structure is determined to be a label.

As shown in query block 238, if the answer to query block 234 is "no," then a query is made (query block 238) as to whether the names of the data structures are indicative of whether the data structure is an identifier value or a label. For example, if a data structure name has a suffix of "CODE" or "ID" or "VALUE," then the data structure is assumed to be an identifier value, and the data structures are determined as such (block 240). Thus, a data structure with a data structure name of "CODE" or "ID" or "VALUE" is determined to be an identifier value, and the other (second) data structure is assumed to be a label having a string name (e.g., "Name," "Age," etc.). If the result of query block 238 is "no," then a query is made as to whether either of the data structures (objects) have been used before (query block 242). If so, then, assuming that the data structure has been recorded in a look-up table describing the data structure as being either an identifier value or a label, the decision can be described and identified according to entries in the look-up table (block 244). If, however, the result of the query shown in query block 246 is "no," then a random guess (block 246) must be made as to whether the data structure is an identifier value or a label, and the process stops (terminator block 248). Note, however, that if the guess is wrong, then the user can switch the descriptors of the data structures (making the "identifier value" data structure a "label" data structure and vice versa), as shown in FIG. 2a at block 220.

Returning now to FIG. 2a, after the initial label and identifier values are established (block 214), the data structures with their corresponding descriptors ("identifier value" or "label") are displayed in the editor of the User Interface (IDE), as described in block 216. A query (query block 218) is made as to whether the user is still holding down a function button such as "Ctrl" after the objects representing the data structures have been dropped into the combo-box. If so, and the descriptors of the data structures are wrong, then the user can manually switch the descriptors of the data structures (making the "identifier value" data structure a "label" data structure and vice versa), as described in block 220. Otherwise, a query is made as to whether the mouse button has been released (query block 222), indicating that the drop is final and the labels and identifier values are bound to the target widget (block 224). The process ends when the decision to bind the data structures with their determined descriptors in a metadata area of the process shown in the IDE, and the results of this determination and binding are recorded in a metadata area of the application under development in the IDE (block 226).

Figure 3:
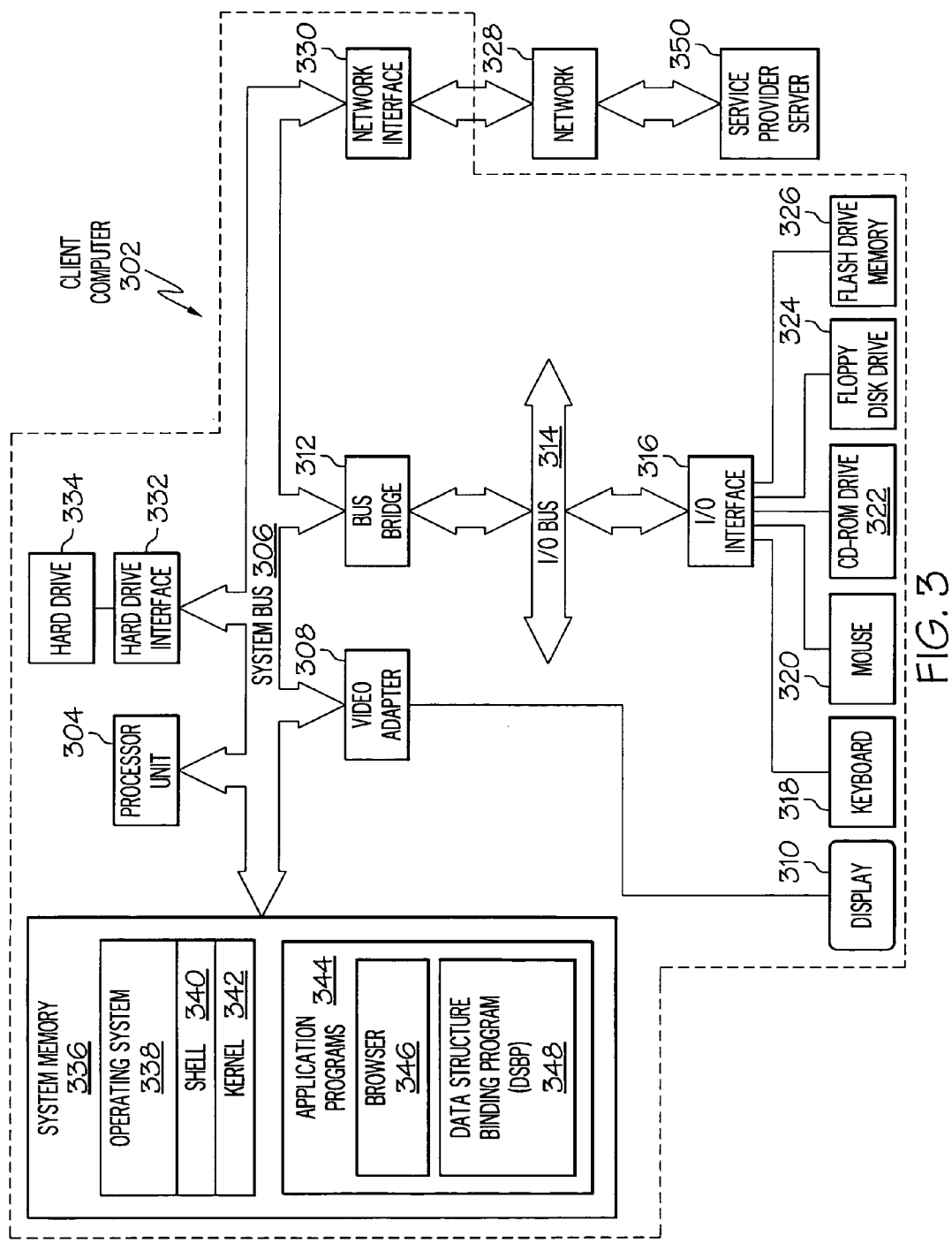
FIG. 3 is an exemplary computer system in which the present invention can be implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 350 via a network 328 using a network interface 330, which is coupled to system bus 306. Network 328 may be an external network such as the Internet, or an internal network such as an Ethernet or a Virtual Private Network (VPN). Using network 328, client computer 302 is able to use the present invention to access service provider server 150.

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 350.

Application programs 344 in client computer 302's system memory also include a Data Structure Binding Program (DSBP) 348. DSBP 348 includes code for implementing the processes described in FIGS. 1a-2b. In one embodiment, client computer 302 is able to download DSBP 348 from service provider server 350.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

As noted above, DSBP 348 can be downloaded to client computer 302 from service provider server 350, which may utilize a same architecture as described above for client computer 302. Note further that, in a preferred embodiment of the present invention, service provider server 302 performs all of the functions associated with the present invention (including execution of DSBP 348), thus freeing client computer 302 from using many of its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

As described herein, in one embodiment of the present computer-implementable method, the steps include predictively determining that a data structure is either an identifier value or a label; and simultaneously associating a predictively determined identifier value and a predictively determined label with a widget in an editor pane in an Integrated Development Environment (IDE), wherein the identifier value is predictively determined by examining a suffix in a name of the data structure, and wherein the data structure is determined to be an identifier value if the suffix is from a group composed of CODE, ID, and VALUE. The data structure can be predictively determined as being either an identifier value or a label by consulting a local look-up table containing recently used data structures that have been identified and recorded in the look-up table as being either an identifier value or a label, and the identifier value identifies a specific label entry, wherein the identifier value and the label are both multi-valued data structures, and wherein each entry in predictively determined identifier values is relationally associated with a corresponding entry in predictively determined labels.

In another embodiment, the computer-implementable method comprises simultaneously dropping two multi-valued data definitions into a widget in an editor pane of an Integrated Development Environment.

In another embodiment, the computer-implementable method comprises drag-and-dropping two data structures from a data tree into a widget, wherein the data tree is displayed in a data pane of an Integrated Development Environment (IDE), and wherein the widget is displayed in an editor pane in the IDE; in response to determining that the widget is list-bindable, that there are exactly two data structures, and that both data structures are multi-valued, predictively determining that one of the data structures is an identifier value and another of the data structures is a label; and binding the two data structures to the widget only if one of the data structures is determined to be an identifier value and another of the data structures is determined to be a label. The method further comprises, in response to determining that both of the two data structures have been incorrectly described as being either an identifier value or a label, switching identifier value and label descriptors between the two data structures before binding the two data structures to the widget. The step of predictively determining that one of the data structures is an identifier value and another of the data structures is a label further includes the steps of determining if one of the data structures is a string list and another of the data structures is a non-string list, wherein if one of the data structures is a string list and another of the data structures is a non-string list, then determining that a string list data structure is a label and a non-string list data structure is an identifier value; determining if one of the data structures is a numeric list and another of the data structures is a non-numeric list, wherein if one of the data structures is a numeric list and another of the data structures is a non-numeric list, then determining that a numeric list data structure is an identifier value and a non-numeric list data structure is a label; in response to determining that object names of the data structures are indicative of whether a data structure is an identifier value or a label, describing and identifying the data structures according to the object names of the data structures; and, in response to determining that either of the data structures have been used and have been identified and recorded in a look-up table as being either an identifier value or a label, describing and identifying the data structures according to entries in the look-up table, wherein if the look-up table is not accessible, then randomly describing and identifying the data structures as being either an identifier value or a label.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:
utilizing a processor in a computer to execute computer program instructions that, when executed, perform the steps of:
drag-and-dropping two data structures from a data tree into a widget, wherein the data tree is displayed in a data pane of an Integrated Development Environment (IDE), and wherein the widget is displayed in an editor pane in the IDE;
binding labels and identifiers to the widget;
recording the labels and identifiers in a metadata area of the IDE;
in response to determining that the widget is list-bindable, that there are exactly two data structures, and that both data structures are multi-valued, predictively determining that one of the data structures is an identifier value and another of the data structures is a label, wherein the identifier value identifies multiple labels for record entries contained within a file identified by the identifier value, and wherein predictively determining that one of the data structures is the identifier value and another of the data structures is the label comprises the steps of:
determining if one of the data structures is a string list and another of the data structures is a non-string list, wherein if one of the data structures is a string list and another of the data structures is a non-string list, then determining that a string list data structure is a label and a non-string list data structure is an identifier value,
determining if one of the data structures is a numeric list and another of the data structures is a non-numeric list, wherein if one of the data structures is a numeric list and another of the data structures is a non-numeric list, then determining that a numeric list data structure is an identifier value and a non-numeric list data structure is a label, in response to determining that object names of the data structures are indicative of whether a data structure is an identifier value or a label, describing and identifying the data structures according to the object names of the data structures, and in response to determining that object names of the data structures are not indicative of whether the data structure is the identifier value or the label and in response to subsequently determining that either of the data structures have been used and have been identified and recorded in a look-up table as being either an identifier value or a label, describing and identifying the data structures according to entries in the look-up table, wherein said determining that either of the data structures have been used and have been identified and recorded in the look-up table as being either the identifier value or the label only occurs after said determining that object names of the data structures are not indicative of whether the data structure is the identifier value or the label;

binding the two data structures to the widget only if one of the data structures is determined to be an identifier value and another of the data structures is determined to be a label;

in response to determining that both of the two data structures have been incorrectly described as being either an identifier value or a label, switching identifier value and label descriptors between the two data structures before binding the two data structures to the widget; and in response to the look-up table not being accessible, randomly describing and identifying the data structures as being either an identifier value or a label.

* * * * *